United States Patent [19]

Kakuchi et al.

[11] Patent Number: 5,087,121
[45] Date of Patent: Feb. 11, 1992

[54] DEPTH/HEIGHT MEASURING DEVICE

[75] Inventors: Osamu Kakuchi, Kawasaki; Mikichi Ban, Yokohama, both of Japan

[73] Assignee: Canon Kabushiki Kaisha, Tokyo, Japan

[21] Appl. No.: 593,253

[22] Filed: Oct. 1, 1990

Related U.S. Application Data

[63] Continuation of Ser. No. 277,544, Nov. 29, 1988, abandoned.

[30] Foreign Application Priority Data

Dec. 1, 1987 [JP] Japan ................. 62-304078
Dec. 1, 1987 [JP] Japan ................. 62-304079
Dec. 1, 1987 [JP] Japan ................. 62-304080

[51] Int. Cl.$^5$ .................. G01B 11/06; G01B 11/22
[52] U.S. Cl. ..................... 356/73; 356/378; 356/382
[58] Field of Search ............ 356/73, 378, 381, 382, 356/445, 446, 448

[56] References Cited

U.S. PATENT DOCUMENTS 4,236,823 12/1980 Roach et al. ............... 356/378
4,615,620 10/1986 Noguchi et al. ............ 356/378
4,787,749 11/1988 Ban et al. ................. 356/381

FOREIGN PATENT DOCUMENTS 62-127605 6/1987 Japan .
85305 4/1988 Japan ...................... 356/378

Primary Examiner—F. L. Evans
Attorney, Agent, or Firm—Fitzpatrick, Cella, Harper & Scinto

[57] ABSTRACT

A device for measuring depth of a groove formed on an article includes a light source for illuminating the article, a first detector for receiving light from a portion of the article having a groove and being illuminated by the light source, and for detecting a spectral reflectance in relation to the received light, a second detector for receiving light from the article illuminated by the light source and for detecting a spectral reflectance in relation to the received light, the second detector being effective to detect the spectral reflectance in a way not affected or substantially not affected by the groove of the article as compared with the detection by the first detector, and a depth detector for detecting the depth of the groove on the basis of the results of detection by the first and second detectors.

37 Claims, 8 Drawing Sheets

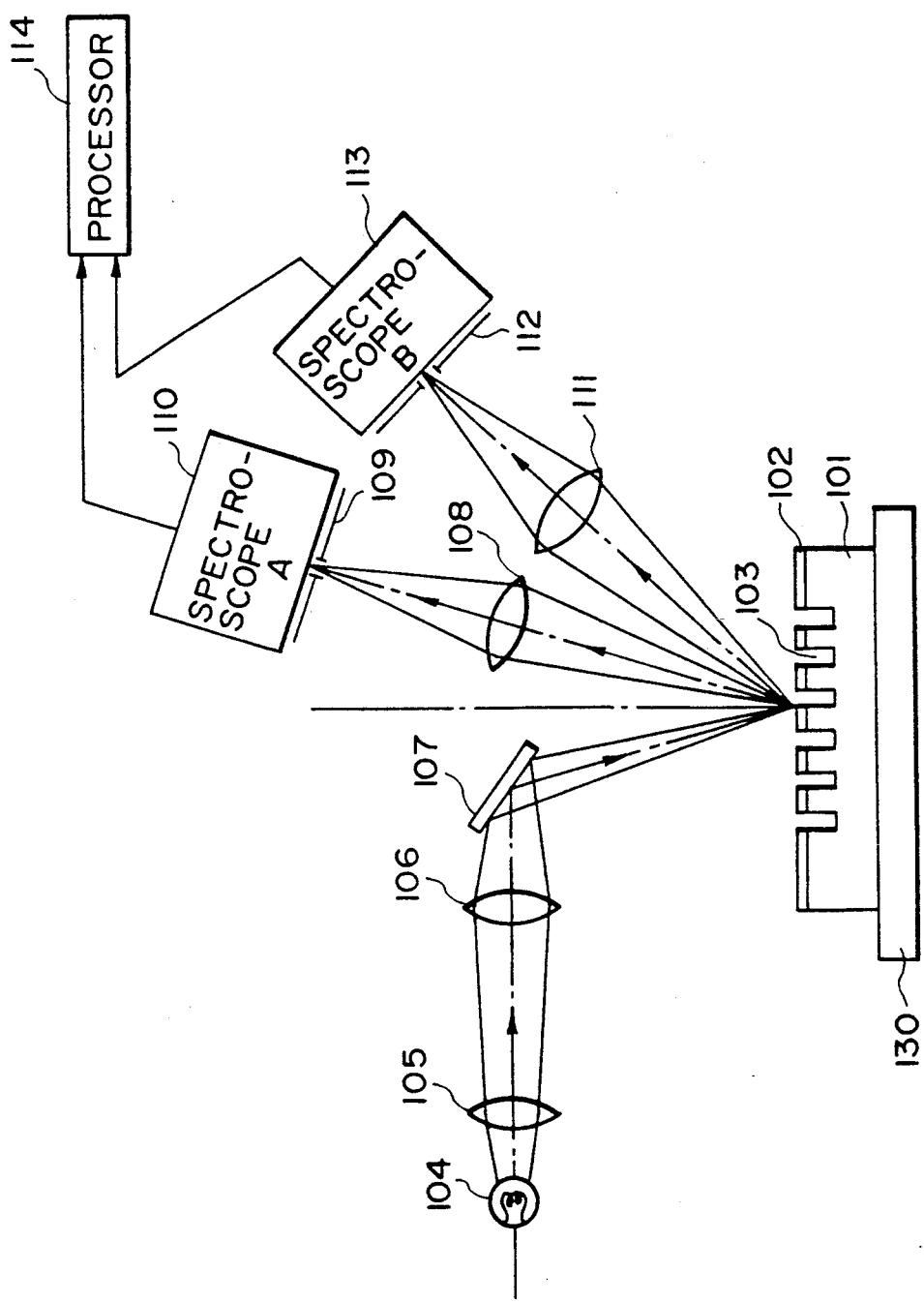
F I G. 7

DEPTH/HEIGHT MEASURING DEVICE

This application is a continuation of application Ser. No. 07/277,544 filed Nov. 29, 1988 now abandoned.

FIELD OF THE INVENTION AND RELATED ART

This invention relates to a depth/height measuring device for measuring the depth/height of a groove or hole or a protrusion of an object to be examined. More particularly, the invention is concerned with a device for measuring the depth/height of a recessed/protruded portion, suitable for measuring with high precision the depth/height of a recessed/protruded portion of an order of a few microns, such as a groove (called a trench) formed on a silicon substrate as a capacitor during a certain process for the manufacture of semiconductor microcircuits, for example.

Many types of measuring devices have been proposed, for measurement with high precision of the depth/height of a recessed/protruded portion formed on an object to be examined and having a depth/height of the order of a few microns.

In the manufacture of recent semiconductor microcircuits, along with the trend of increasing the degree of integration of microcircuits, it has become desirable to produce a so-called trench capacitor wherein a capacitor is provided by forming grooves of a depth of a few microns on a silicon substrate. Naturally, development of measuring devices for measuring the depth of such a trench with high precision is also desired. Conventional trench depth measuring devices use a scanning electron microscope (SEM) for observing and measuring the section of a fraction of an article being examined. As an alternative, there is a measuring device wherein light is projected upon an article being examined and the measurement is made by utilizing interference of light reflected from the article.

FIGS. 1A and 1B schematically show a known type measuring device which uses the interference of light reflected from a recessed/protruded portion.

In these Figures, light from a white light source 62 is projected upon an article 61 to be examined, via a condenser lens 63, a half mirror 65 and an objective lens 64. The light reflected from the article 61 is directed to a pinhole member 67 by way of the objective lens 64, the half mirror 65 and an imaging lens 66. The pinhole member 67 and the article 61 are disposed in an optically conjugate relationship. Where the diameter of the pinhole is $\phi P$, the diameter of the measurement area is $\phi S$ and the imaging magnification from the article 61 to the pinhole member 67 surface is $\beta$, then there is a relationship $\phi S = \phi P / \beta$.

The light passing the pinhole 67 is examined spectrally by a spectroscope 68. Assuming now that the structure of the recessed/protruded portion of the article 61 is such as shown in FIG. 2 wherein there is formed a masking material, such as a multilayered film (or a single-layer film) of photoresist, of the shape as illustrated, on the upper surface portion of the trench 36, when light is projected upon the surface of the article having a trench structure formed thereon, there occurs interference of light 32 reflected by the masking material surface with light 31 reflected by the bottom surface of the trench, the interference being determined by the depth of the trench. Where the number of layers of the masking material is L; the trench depth is $d_T$; the refractive index within the trench is $n_T$; the thickness of the i-th layer of the masking material is $d_i$; the amplitude reflectance of the masking material surface is $\rho_M e^{i\phi_M}$ (usually, this is an equation of multireflection); the amplitude reflectance of the trench bottom surface is $\rho_T e^{i\phi_T}$; the aperture ratio, i.e., the ratio of area occupied by the trench to the measuring area is A; and the efficiency of light rays within the trench aperture, i.e. the ratio of the intensity of light coming back from the trench aperture (being effective to cause interference) to the intensity of light entering into the trench aperture, is K; then the spectral reflection characteristics (spectral reflectance $R(\lambda)$) that can be detected by the spectroscope 8 in FIG. 1 can be expressed as follows:

$$R(\lambda) = (1-A) \cdot \rho_M^2 + A \cdot K \cdot \rho_T^2 + 2\sqrt{A \cdot (1-A) \cdot K} \cdot \rho_M \cdot \rho_T \cdot \cos(\phi_M - \phi_T - \delta) \quad (1)$$

$$\delta = (2\pi/\lambda) \cdot 2n_T \left( d_T + \sum_{i=1}^{N} d_i \right) \cdot \cos\theta$$

where, is the wavelength and $\theta$ is the angle of incidence.

If in the above equation $\rho_M = \rho_T$ and $\phi_M = \phi_T$, then it represents the reflection factor of only the trench portion having no masking material. If, at this time, $\phi_M$ and $\phi_T$ have a little change with the wavelength $\lambda$, it results that equation (1) contains a periodic function of an amplitude $$2\sqrt{A \cdot (1-A) \cdot K} \cdot \rho_M \cdot \rho_T$$

as set forth in the third term, the period thereof being determined by the trench depth $d_T$. Also, the first term represents the characteristics of the masking material as determined by the film thickness and the refractive index of the masking material. For a single-layer film, it is a periodic function proportional to the film thickness. For a multilayered film, the characteristics are more complex. As a sum of these characteristics, $R(\lambda)$ has a shape such as depicted at 41 in FIG. 3, for example. Usually, the characteristics depicting the trench depth (the third term in equation (1)) has a higher frequency than that of the characteristics of the masking material (the first term in equation (1)) and the characteristics of the trench bottom surface (the second term in equation (1)). Therefore, the characteristics as detected by the spectroscope 8 is quantized by an analog-to-digital converter (hereinafter A/D converter) 69 and then is supplied to a digital high-pass filter 70, whereby as an output only a high-frequency component in the third term indicative of the trench depth is extracted, with the first and second terms of equation (1) being erased.

Subsequently, the amplitude is enlarged to a certain value by an amplitude enlarging portion 71. This is made to meet even such a case where the aperture ratio A and the efficiency K are smaller and, therefore, only a feeble signal indicative of the trench depth is obtainable. Then, a maximal value $(1/\lambda_1)$ and a minimal value $(1/\lambda_2)$ of the wave 41 shown in FIG. 3 are detected. For a simple case wherein no masking material is present: The maximal value $$2n_T d_T \cos\theta = m\lambda_1 \text{ (m is an integral number)}$$

The minimal value $$2n_T d_T \cos\theta = (m - \tfrac{1}{2})\lambda_2$$

Therefore $$d_T = \frac{1}{4(1/\lambda_1 - 1/\lambda_2) \cdot \cos\theta} \quad (n_T = 1.0) \qquad (2)$$

Since $\theta$ is known, the trench depth $d_T$ can be detected on the basis of $\lambda_1$ and $\lambda_2$ determined by a peak detecting portion 72. Similarly, for a case wherein a masking material is present, the trench depth $d_T$ can be detected by incorporating into equation (2) a coefficient for correcting the effect of the masking material.

Also, as shown in FIG. 1B, those data having been quantized by the A/D converter 69 may be transformed in terms of the frequency region by an FFT portion 75 so that the trench depth calculation at block 76 may be made by using the so processed data. By doing so, the trench depth can be detected.

The measurement process having been described with reference to FIGS. 1A and 1B, however, involves the following inconveniences:

1) For a sample having a masking material, if the aperture ratio (A) and the efficiency (K) of the trench are small so that the signal indicative of the trench depth is feeble, there remains after the exclusion of the characteristics of the masking material by using a high-pass filter a feeble signal of a period which is equal to a multiple, by an integral number, of the aforesaid period (namely, in this example, a high frequency signal due to the interference of light reflected by the upper surface of the masking material with light caused by the multireflection between the upper and lower surfaces of the masking material). These signals provide a noise component which is mixed into the period representing the trench depth and the later can not be extracted.

2) Where the optical path length of the masking material and the optical path length of the trench depth are close to each other, it is difficult to extract only a signal indicative of the trench depth by use of a high-pass filter. Thus, the above-described separate characteristics will be confused or, alternatively, those characteristics will be erased. It is therefore difficult to extract only the characteristics indicative of the trench depth.

3) With the method of detecting a trench depth signal after the transformation of an obtained output into a frequency region (i.e. by factorization for each frequency component by using Fourier transformation), the trench depth signal is mixed with a signal of a multiple, by an integral number, of the period of the masking material characteristics, particularly when the trench depth signal is feeble. Thus, it is difficult to extract the same.

SUMMARY OF THE INVENTION

It is an object of the present invention to provide a device for measuring the depth/height of a recessed/-protruded portion, particularly suitable for measurement of trench depth, by which only a signal exactly indicative of the trench depth can be extracted even where the above-described problems are involved, thus ensuring the measurement of a sample which is not attainable with the conventional measuring devices or methods and also assuring high-precision measurement of a sample to which only unstable measurement can be made with the conventional devices and methods.

In accordance with one preferred form of the present invention, spectral reflection characteristics of an article being examined are detected and those spectral reflection characteristics of such a portion of the article having a recess/protrusion and such a portion having no recess/protrusion are measured. The signal processing is made by using those spectral reflection characteristics and, based on this, only the characteristics indicating the depth/height of the recessed/protruded portion are extracted.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 7 is a schematic illustration of a film thickness and groove depth measuring device, in accordance with one aspect of the present invention.

DESCRIPTION OF THE PREFERRED EMBODIMENTS

Figure 4:
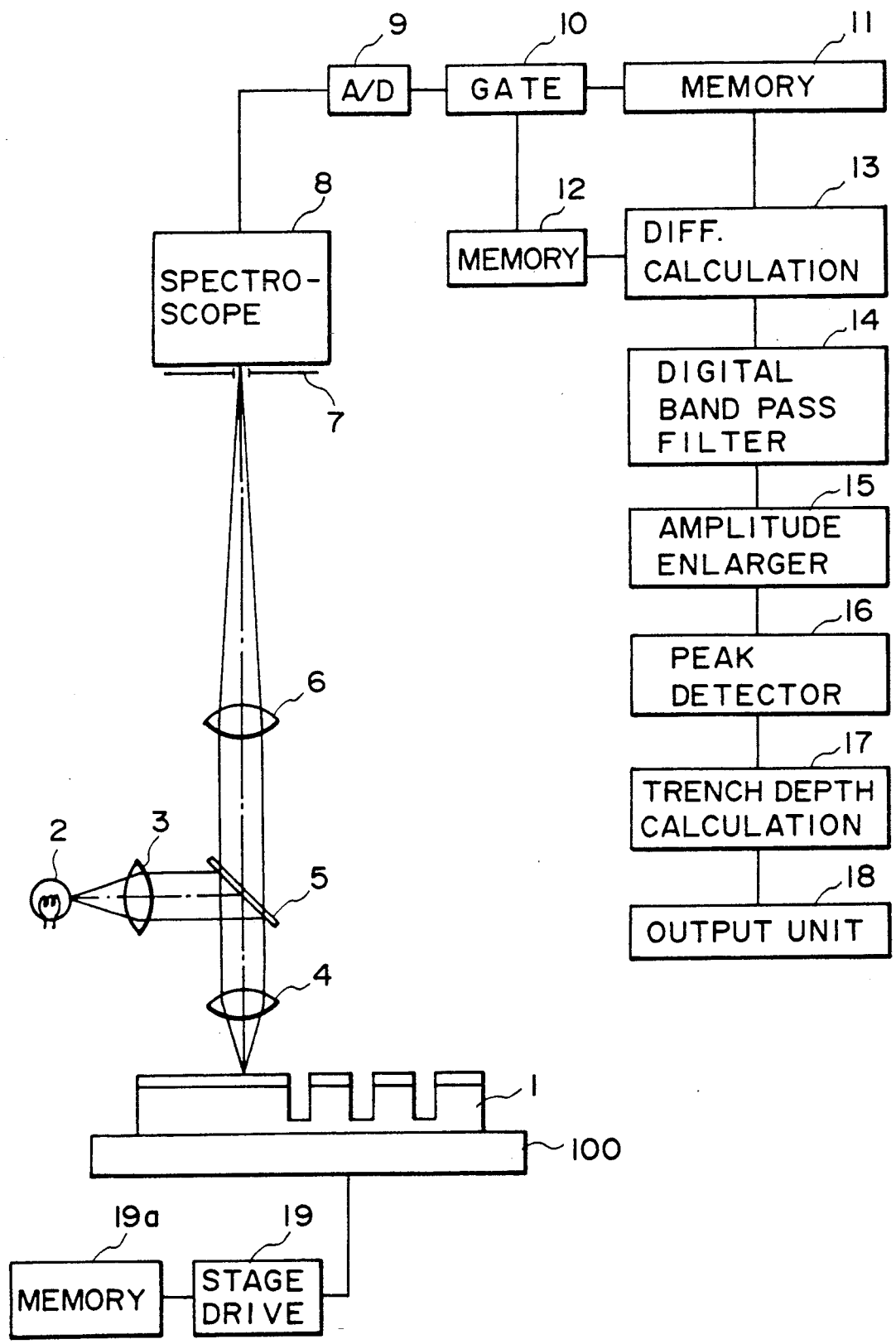
FIG. 4 is a schematic and diagrammatic illustration showing a trench measuring optical arrangement and measuring procedure, in accordance with one embodiment of the present invention.

Referring now to FIG. 4 which is a schematic and diagrammatic representation showing an optical arrangement and measuring procedure according to one embodiment of the present invention, denoted at 1 is an article to be examined, whose surface is formed with trenches, a masking material is applied to the trench surface. Denoted at 2 is a white light source; at 3, is a condenser lens; denoted at 4, is an objective lens; at 5, is a half mirror; denoted at 6, is an imaging lens; denoted at 7, is a pinhole member; denoted at 8, is a spectroscope; denoted at 9, is an A/D converter; denoted at 10, is a gate; at 11 and 12, is memories each for storing therein the spectral characteristics; denoted at 13, is an operation unit for calculating the difference between the data stored in the memories 11 and 12; denoted at 14, is a band-pass filter effective to pass only those signal characteristics indicative of the trench depth; and denoted at 15, is an amplitude enlarger effective to enhance the contrast of the trench depth signal. Those components denoted at 13-15 cooperate to provide a signal processing portion for extracting only the trench depth signal. Further, there are provided a detecting portion 16 for detecting a maximal peak and a minimal peak of the characteristics of the trench depth and a calculating portion for calculating the trench depth. The components 16 and 17 cooperate to provide a calculating means. Denoted at 18 is an output unit; denoted at 100, is a stage for holding the article to be examined; and at 19, is a stage driving unit for moving the stage 100.

Light from the white light source 2 is projected upon an article 1 to be examined, via the condenser lens 3, the half mirror 5 and the objective lens 4. The light reflected from the article 1 is directed to the pinhole member 7 by way of the objective lens 4, the half mirror 5 and the imaging lens 6. A portion of the incident light passes through the pinhole 7 and then is examined spectrally by the spectroscope, within a wavelength range necessary for the measurement. In this example, the article 1 to be examined and the pinhole member 7 are disposed in an optically conjugate relationship. If the diameter of the pinhole is $\phi P$ and the magnification from the article 1 to the pinhole 7 surface is $\beta$, then the diameter $\phi S$ of the measuring area can be given by $$\phi S = \phi P / \beta$$

Namely, only the reflection light within the diameter $\phi S$ is subjected to the measurement.

Before the measurement, the stage driving portion 19 moves and positions the article 1 so that the measuring area is defined on such portion of the article 1 surface in which at least a part of a trench is present. Then, the spectral characteristics of the reflection light are detected in the above-described procedure and, thereafter, the detected characteristics are quantized by the A/D converter 9. Then, by the cooperation of the gate 10, the result is stored into the memory 11 as the spectral characteristics for the portion in which the trench exists. Next, the stage driving portion 19 operates to move and position the article 1 so that such a portion thereof having no trench is set. In a similar procedure, the spectral characteristics are measured and a corresponding signal is applied to the gate 10. At this time, the gate 10 is switched so that the data is stored into the memory 12 as the spectral characteristics of the portion having no trench.

The position of the article 1 portion having a trench to be examined as well as the position of the article 1 portion having no trench and being suitable for the comparative measurement purpose, have been stored into a memory 19a as corresponding data. Before the measurement, the article 1 is positioned at a predetermined site with respect to the stage 100, by using a suitable positioning means (not shown). In accordance with the data stored in the memory 19a, the stage driving portion 19 operates to move the stage 100 so as to bring the article 1 portion having a trench and the article 1 portion having no trench into the measuring region defined below the objective lens 4, in an appropriate order.

Where the spectral reflection characteristics as stored in the memories 11 and 12 are denoted by $R_{TM}(\lambda)$ and $R_M(\lambda)$, respectively, then the difference calculating operation unit 13 makes the following calculation:

$$\Delta R(\lambda) = R_{TM}(\lambda) - K(\lambda) \cdot R_M(\lambda) \quad (3)$$

wherein $K(\lambda)$ is a corrective coefficient.

Figures 1A, 1B:
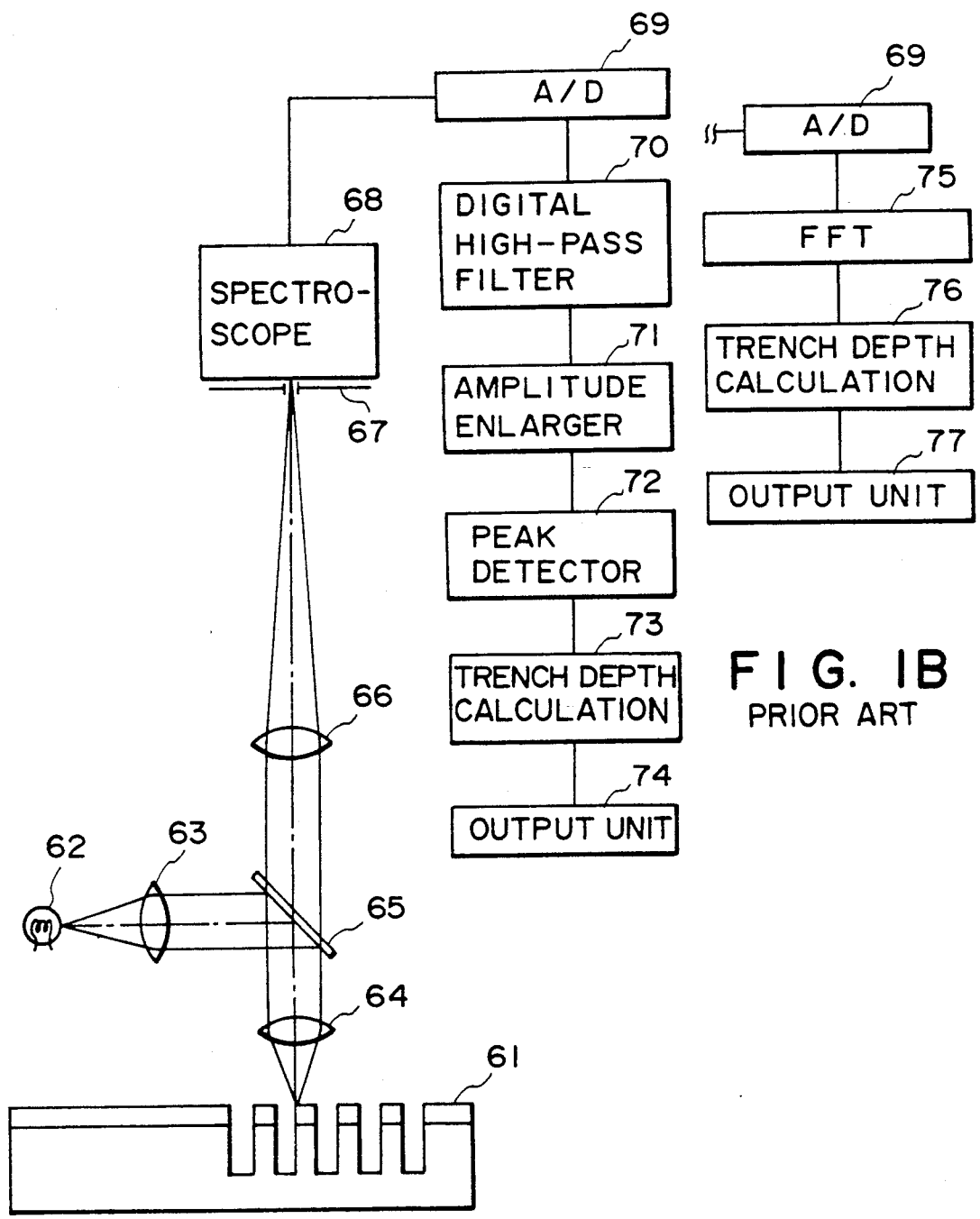
FIGS. 1A and 1B schematically show a known type depth measuring device.
Figure 2:
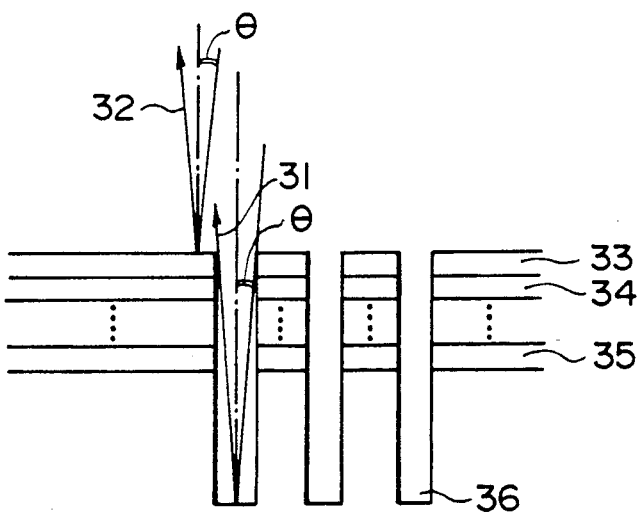
FIG. 2 is a schematic section of a trench sample.
Figure 3:
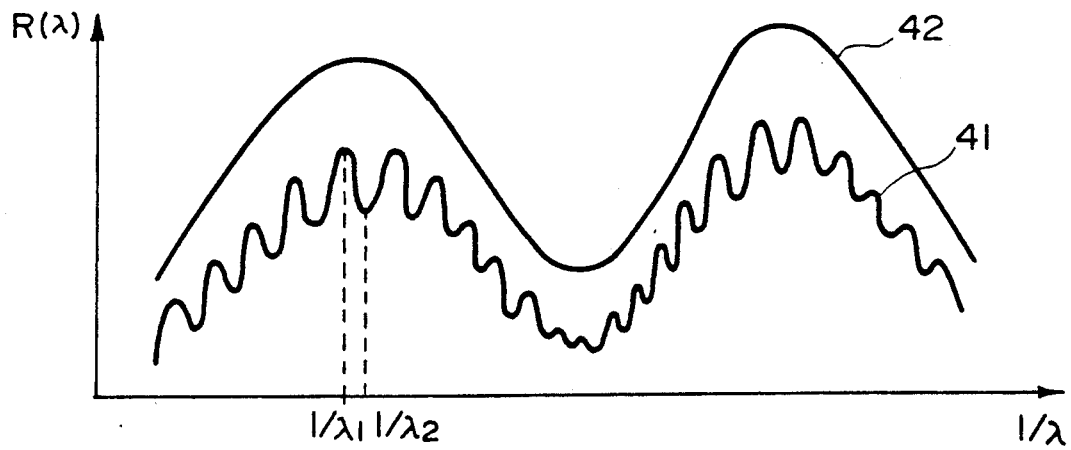
FIG. 3 is a representation showing the spectral reflection characteristics of a surface portion having a trench and a surface portion having a masking material only.
Figure 5:
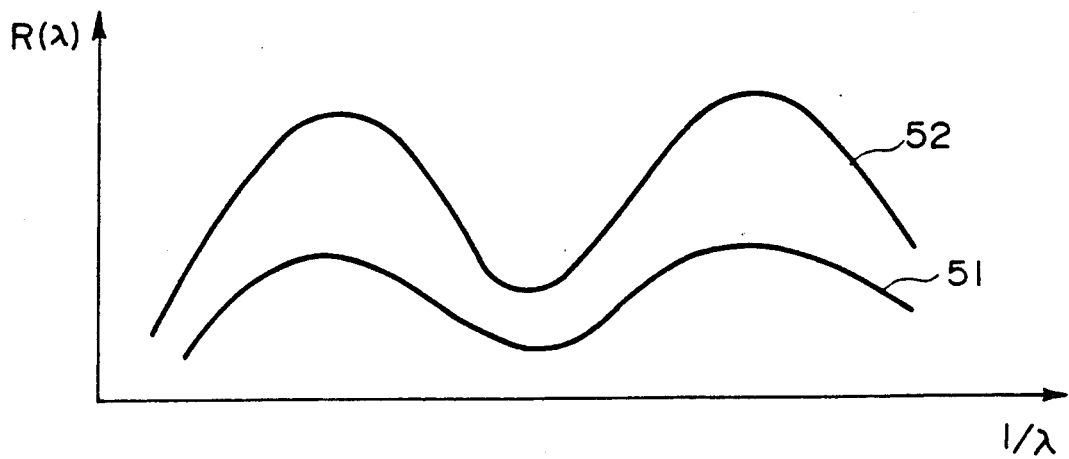
FIG. 5 is a representation showing the characteristics as obtained by processing the characteristics shown in FIG. 3 by use of a low-pass filter.

The characteristics $R_{TM}(\lambda)$ of the portion having a trench are such is as depicted at 41 in FIG. 3, as described hereinbefore. On the other hand, the characteristics $R_M(\lambda)$ of the portion having no trench are, because they are free from the characteristics of the trench depth, depicted at 42 in FIG. 3. Both of these spectral reflection characteristics $R_{TM}(\lambda)$ and $R_M(\lambda)$ contain similar components resulting from the characteristics of the masking material. Since, however, there is a difference in the light quantity of total reflection at the respective portions, there is a difference in magnitude between the respective masking material characteristics signals. Thus, the relationship between $R_{TM}(\lambda)$ and $R_M(\lambda)$ is such that, for example, as shown in FIG. 3, there is a difference in magnitude in respect to not only the high-frequency component signal but also in the low-frequency component signal. The corrective coefficient is used to correct such a difference in the signal component related to the characteristics of the masking material. Normally, it may be a function depending on the wavelength. If, however, its value does not change so largely within a used wavelength range, the corrective coefficient may be a constant which does not depend on the wavelength. Also, the corrective coefficient $K(\lambda)$ may be specified manually by an operator or, alternatively, it may be calculated automatically by an appropriate calculation processing. As for the latter case, by way of example, the characteristics $R_{TM}(\lambda)$ depicted at 41 in FIG. 3 and $R_M(\lambda)$ depicted at 42 may be used. More specifically, a digital low-pass filter may be used for those characteristics $R_{TM}(\lambda)$ and $R_M(\lambda)$ so as to extract only the low frequency component, as depicted in FIG. 5. Where an output corresponding to $R_{TM}(\lambda)$ 41 is represented by $R_{TMLO}(\lambda)$ 51 while an output corresponding to $R_M(\lambda)$ 42 is represented by $R_{MLO}(\lambda)$ 52, then the following examples may be considered: Where dispersion due to the wavelength, also, is taken into account, then $$K(\lambda) = R_{TMLO}(\lambda) / R_{MLO}(\lambda) \quad (4)$$

As a coefficient independent of the wavelength, $$K(\lambda) = Ave(R_{TMLO}(\lambda) / R_{MLO}(\lambda)) \quad (5)$$

wherein the parenthesis Ave denotes an average of coefficients for different wavelengths.

Equation (4) is effective where there is a difference between the optical path length of the trench depth and the optical path length of the masking material and, particularly, when the trench depth signal becomes feeble. Also, equation (5) is effective where the optical path length of the trench depth and the optical path length of the masking material are close to each other so that a strong trench depth signal is obtainable.

By using such a corrective coefficient determined in the described manner, the magnitude relationship of the signals related to the characteristics $R_{TM}$ and $R_M$ of the masking material is corrected. Then, by detecting the difference therebetween, in accordance with equation (3), a result $\Delta R(\lambda)$ is produced which substantially purely represents only the characteristics of the trench depth.

In place of equation (3), a calculation may be made in accordance with the following equation:

$$R'(\lambda) = R_{TM}(\lambda)/(K(\lambda)R_M(\lambda))$$

Of course, the order of measurements of $R_{TM}(\lambda)$ and $R_M(\lambda)$ may be reversed.

The value $\Delta R(\lambda)$ calculated by the block 13 and represented by equation (3) is applied to the digital band-pass filter 14 which is operable to pass only the characteristics representing the trench depth, whereby any residual mask material characteristics not having been excluded by the difference calculation at block 13, as well as any noise component, are erased. Thereafter, by the amplitude enlarging portion 15, and, the contrast of the trench depth signal is enhanced. Thus, the extreme value detection is facilitated. At the peak detecting portion 16, all the extreme values within the measurement wavelength range are detected.

In equation (1), the characteristics indicative of the trench depth (the third term) is represented by $R_T(\lambda)$. Namely, $$R_T(\lambda) = 2\sqrt{A \cdot (1-A)K} \cdot \rho_M \cdot \rho_T \cos(\phi_M - \phi_T - \delta) \quad (6)$$

In equation (6): A maximal value is provided when:

$\phi_M - \phi_T - \delta = 2m\pi$ (m is an integral number)

A minimal value is provided when:

$\phi_M - \phi_T - \delta = (2m-1)\pi$ (m is an integral number

Namely, by detecting $\lambda_1$ and $\lambda_2$ by using the characteristics shown in FIG. 3, $$\phi_M(\lambda_1) - \phi_T(\lambda_1) - (2\pi/\lambda_1) \cdot 2n_T \cdot \left(d_T + \sum_{i=1}^{N} d_i\right) \times \quad (7)$$

$$\cos\theta = 2m\pi$$

$$\phi_M(\lambda_2) - \phi_T(\lambda_2) - (2\pi/\lambda_2) \cdot 2n_T \cdot \left(d_T + \sum_{i=1}^{N} d_i\right) \times \quad (8)$$

$$\cos\theta = (2m-1)\pi$$

From equations (7) and (8), the trench depth $d_T$ is given by:

$$d_T = \frac{[\pi + \phi_M(\lambda_1) - \phi_M(\lambda_2) - \phi_T(\lambda_1) + \phi_T(\lambda_2)]}{[4\pi \cdot n_T \cdot \cos\theta \cdot (1/\lambda_1 - 1/\lambda_2)]} - \sum_{i=1}^{N} d_i \quad (9)$$

In the calculating unit 17, the detected extreme values are substituted into equation (9), whereby the trench depth $d_T$ is detected.

In equation (9), ), $\phi_M(\lambda_1)$, $\phi_M(\lambda_2)$, $\phi_T(\lambda_1)$ and $\phi_T(\lambda_2)$ are Fresnel coefficients which can be determined by calculation provided that the extreme wavelengths $\lambda_1$ and $\lambda_2$ have been detected and the structure of the masking material (film thickness and refractive index) have been detected. Also, $$\sum_{i=1}^{N} d_i,$$

$n_T$ and $\theta$ are known. Thus, it is possible to detect the trench depth. Actually, by using all the neighboring extreme values and in accordance with equation (9), many trench depths are detected and then they are averaged. Thus, the stability of the signal is increased.

Figure 6:
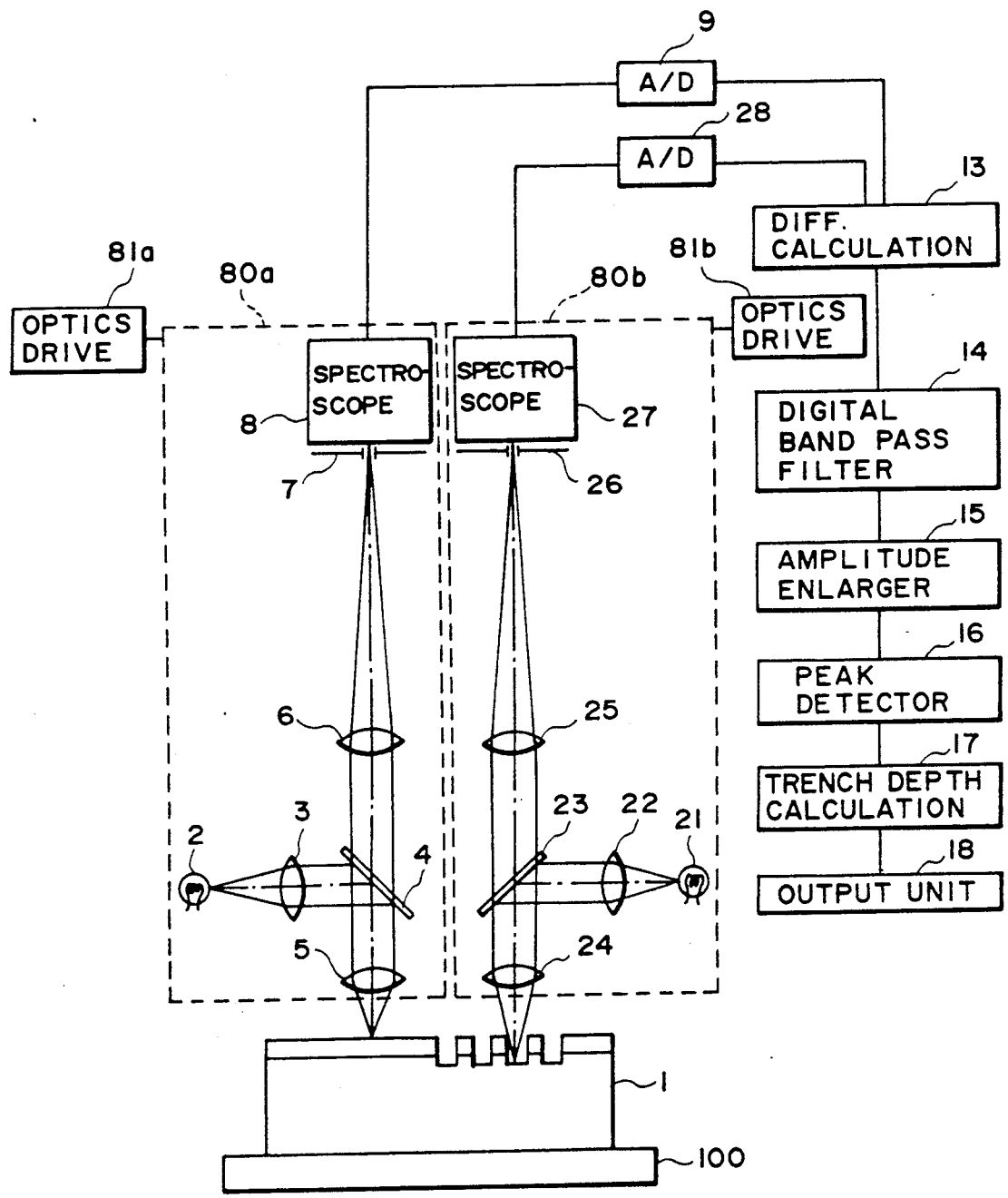
FIG. 6 is a schematic and diagrammatic representation showing a trench measuring optical arrangement and measuring procedure, in accordance with a second embodiment of the present invention.

FIG. 6 is a schematic and diagrammatic representation showing an optical arrangement and measuring procedure, in accordance with a second embodiment of the present invention.

Denoted at 21 is a white light source; denoted at 22, a condenser lens; denoted at 23, is a half mirror; denoted at 24, is an objective lens; denoted at 25, is an imaging lens; denoted at 26, is a pinhole member; at 27, is a spectroscope; and denoted at 28, is an A/D converter. The same reference numerals as in the FIG. 4 embodiment are assigned to corresponding elements.

In this embodiment, there are provided separate measuring means which are effective to measure the spectral reflection characteristics of such a portion having trenches and such a portion having no trench, respectively. The structural portion comprising elements 2–9 is effective to measure the spectral reflection characteristics of the portion having no trench. The spectral portion of a similar arrangement and comprising elements 21–28 is operable to measure the spectral reflection characteristics of the portion having trenches. Similar signal processings are made to these separate measuring means to detect the trench depth.

As in the foregoing embodiment, the position of the article 1 portion having a trench to be examined as well as the position of the article 1 portion having no trench, have been preparatorily stored into a memory (not shown) as data. Before measurement, the article 1 is positioned at a predetermined site on the stage 100 by using an appropriate positioning means, not shown. The components 2–8 and the components 21–27 are housed in frames 80a and 80b, respectively and they are movable as a unit. Optics driving portions 81a and 81b are operable in accordance with the data stored in the unshown memory to move the frames 80a and 80b, respectively, so as to bring the article 1 portion having no trench and the article 1 portion having a trench into the fields of the objective lenses 5 and 24, respectively.

By using such a two-channel measuring system, it is possible to make measurements to different portions at the same time. Therefore, the measuring time can be reduced.

In this embodiment, the A/D converters 9 and 28 may be omitted so that the difference calculation may be made in terms of an analog quantity. In that case, in place of the digital band-pass filter, an analog band-pass filter may be used. Also, for the article 1 portion having no masking material or in the case where the magnitude of the trench depth signal is large, the difference calculation may be omitted and the signal of the spectral reflection characteristics of the recessed/protruded portion may be directly inputted into a band-pass filter. The arrangement may thus be modified so that the signal processing may be switched to effect the depth calculation in the described manner. Only passing a signal through a band-pass filter is effective to remove a low frequency component resulting from swelling due to the film thickness, for example, as well as to exclude a high-frequency component resulting from swelling due to the light reflected by plural times between the upper and lower surfaces of the film.

As described hereinbefore, by measuring those spectral reflection characteristics of such a portion having a recessed/protruded portion and of such a portion having no recess/protrusion and by executing specific signal processing to those spectral reflection characteristics, those signals other than the characteristics indicative of the depth/height of the recess/protrusion can be excluded and, therefore, only the signal representing the depth/height of the recess/protrusion can be extracted. As a result, for such an article to be examined with respect to which the measurement is not possible or quite unstable with the conventional measuring devices and methods, measurement can be made very stably.

Next, a third embodiment of the present invention will be explained.

For measurement of a thickness of a thin film, detecting a specularly reflected light is suitable. On the other hand, for measurement of a depth of a trench (hereinafter "groove"), detecting a scattered light is suitable.

In the present embodiment, there are provided first and second detecting means for detecting a specularly reflected light and a scattered light from a sample being illuminated. By using an output from the first detecting means, the thickness of a film can be calculated, whereas by using an output of the second detecting means, the depth of a recess (groove) can be calculated. Namely, by using one single machine, both of them can be measured conveniently.

Also, in the present embodiment, for calculation of the depth of a recess, the output of the second detecting means is used after it is subjected to the subtraction with use of the output from the first detector. This ensures sufficiently high precision measurement.

FIG. 7 shows the third embodiment and FIGS. 8A-8D illustrate waveforms of outputs as supplied by various blocks in FIG. 7.

Illustrated in FIG. 7 is an embodiment which is adapted to measure the thickness of a thin film 102 provided on the surface of a sample 101 as well as the depth of a groove 103. Light source 104 of the type that emits light of a broad band (more specifically, a halogen lamp, for example) and lenses 105 and 106 as well as a mirror 107 are used to illuminate the surface of a sample 101 which is held by attraction on a known type X-Y stage 130. The light specularly reflected from the sample is collected by a lens 108 so that the sample 101 surface is imaged. On the imaging plane, there is provided a pinhole member or aperture member 109 such as a slit, for example. Behind the aperture 109, there is disposed a spectroscope A (110) by which the spectral characteristics of the specularly reflected light are measured. On the other hand, the light scattered by the sample is collected by another lens 111 so that the sample 101 surface is imaged. On the imaging plane, there is provided a pinhole member or an aperture member 112 such as a slit. Behind the aperture 112, there is disposed another spectroscope B (113) by which the spectral characteristics of the scattered light are measured. Outputs of these spectroscopes A and B (110 and 113) are applied to a processor 114 whereby the thickness of the thin film 102 and the depth of the groove are detected by calculation.

Figure 8A:
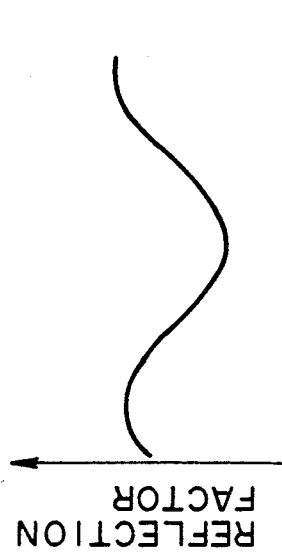
FIGS. 8A-8D are graphs, respectively, exemplifying outputs of various blocks shown in FIG. 7.

FIG. 8A exemplifies an output of the spectroscope A (110) shown in FIG. 7, wherein the axis of the abscissa denotes the wavelength while the axis of ordinate denotes the reflection factor. Large or slow swelling or waviness is caused by the interference of lights reflected by the upper and lower surfaces of the thin film 102. Fine or quick swelling or waviness is caused by the interference of the light reflected from the bottom surface of the groove 103 with the light reflected from the thin film 102. For a specularly reflected light, in many cases such fine swelling has a very small extension. The period of each swell is interrelated with the thickness of the thin film 102 or the depth of the groove 103, and can be detected by calculation in a known manner such as disclosed in Japanese Laid-Open Patent Application, Laid-Open No. Sho 62-127605, for example.

Figure 8C:
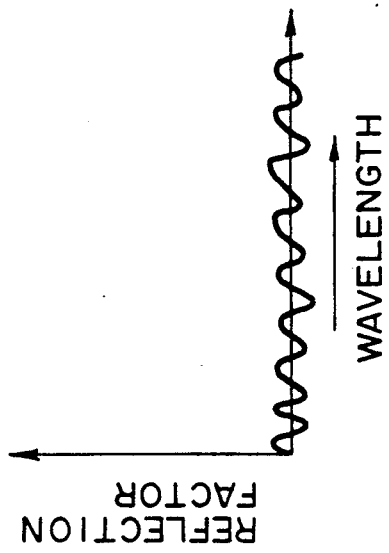
Figure 8B:
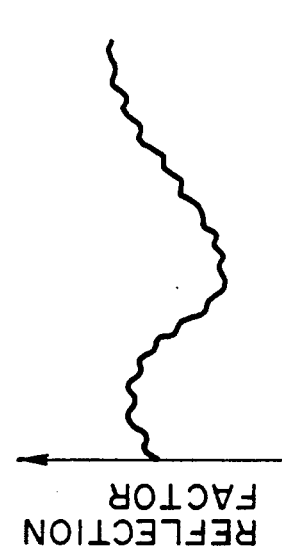

FIG. 8B exemplifies an output of the spectroscope B (113) of FIG. 7. As compared with the output shown in FIG. 8A, there appears fine swelling of larger extension, due to the presence of the groove 103. On the other hand, there still remains slow swelling by the thin film 102. As an example of the processor 114 of FIG. 7, the output as shown in FIG. 8A may be passed through a high-frequency component intercepting filter, whereby fine swelling is intercepted and only large or slow swelling is extracted. Thus, a spectral reflectance curve such as shown in FIG. 8C may be produced. The spectral reflectance at this time can be considered as being provided substantially purely by the interference of lights reflected from the upper and lower surfaces of the thin film. Therefore, by using such spectral reflectance, the thickness of the thin film 102 can be calculated. This ensures exact measurement of the thickness of the thin film 102. The film thickness measuring portion of the processor 114 may be of such a configuration in which the output of the high-frequency component intercepting filter is applied to a peak detecting calculating portion as shown in FIG. 4 for film thickness calculation and the result of calculation is outputted from an output unit.

Figure 8D:
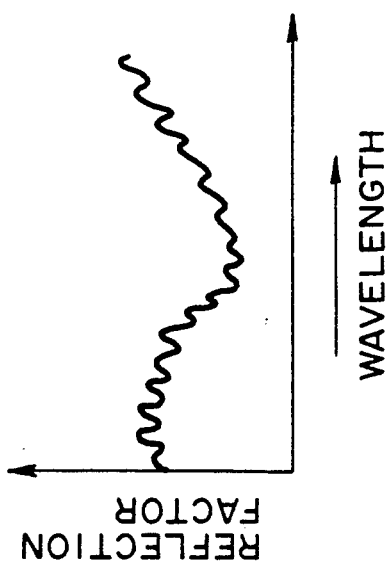

Next, the fine swelling in the output of FIG. 8B is used for the measurement of the depth of the groove. Such a fine swelling contains a high frequency component resulting from the interference of light reflected by the upper surface of the thin film with light having been multi-reflected between the upper and lower surfaces of the thin film; and a high-frequency component resulting from the interference of light reflected from the upper or lower surface of the thin film with light passing through the sample 1 and coming back to the surface thereof. These components are contained as noise. Although similar components are contained in the output shown in FIG. 8A, substantially no swelling due to the interference of lights reflected from the bottom surface of the groove and the thin film is included in the output shown in FIG. 8A. Thus, a difference between the outputs of FIGS. 8A and 8B is detected. Since in this detected difference there remains a large or slow swelling component due to the inherent difference in intensity between the specularly reflected light and the scattered light, the signal is additionally passed through a low frequency intercepting filter which is effective to remove such a large swelling component. By this, there may be produced such a waveform as shown in FIG. 8D, being formed only by fine swelling due to the interference of substantially only those lights from the bottom surface of the groove and from the thin film. Therefore, from such fine swelling which is stable and which has a little noise, the depth of the groove 103 can be calculated. Thus, it is possible to obtain a high-precision measured value. The groove depth measuring portion of the processor 114 may be of such a configuration in which an output of a low-frequency intercepting filter is applied to a peak detecting and calculating portion as shown in FIG. 4 for calculation of the groove depth and the result of calculation is outputted from an output unit. For the calculation, equation (9) may be used. In that case, the data of measured value obtained by the measurement of the film thickness is substituted into equation (9).

The inherent difference in intensity between the scattered light and the specularly reflected light may be corrected. Namely, the output of FIG. 8A may be corrected so that, while maintaining the phase and frequency thereof as they are, the amplitude and the amplitude center thereof are coordinated with those of the output of FIG. 8B. Thereafter, any difference between these outputs may be detected. In that case, the depth measuring portion may be arranged so that the outputs of the spectroscopes A and B are applied to the respective A/D converters and, thereafter, are applied to a difference calculator 13 shown in FIG. 6. The procedure following thereto may be the same as that in the second embodiment. In that case, the digital band-pass filter 14 corresponding to a low-frequency intercepting filter may be omitted.

Figure 9:
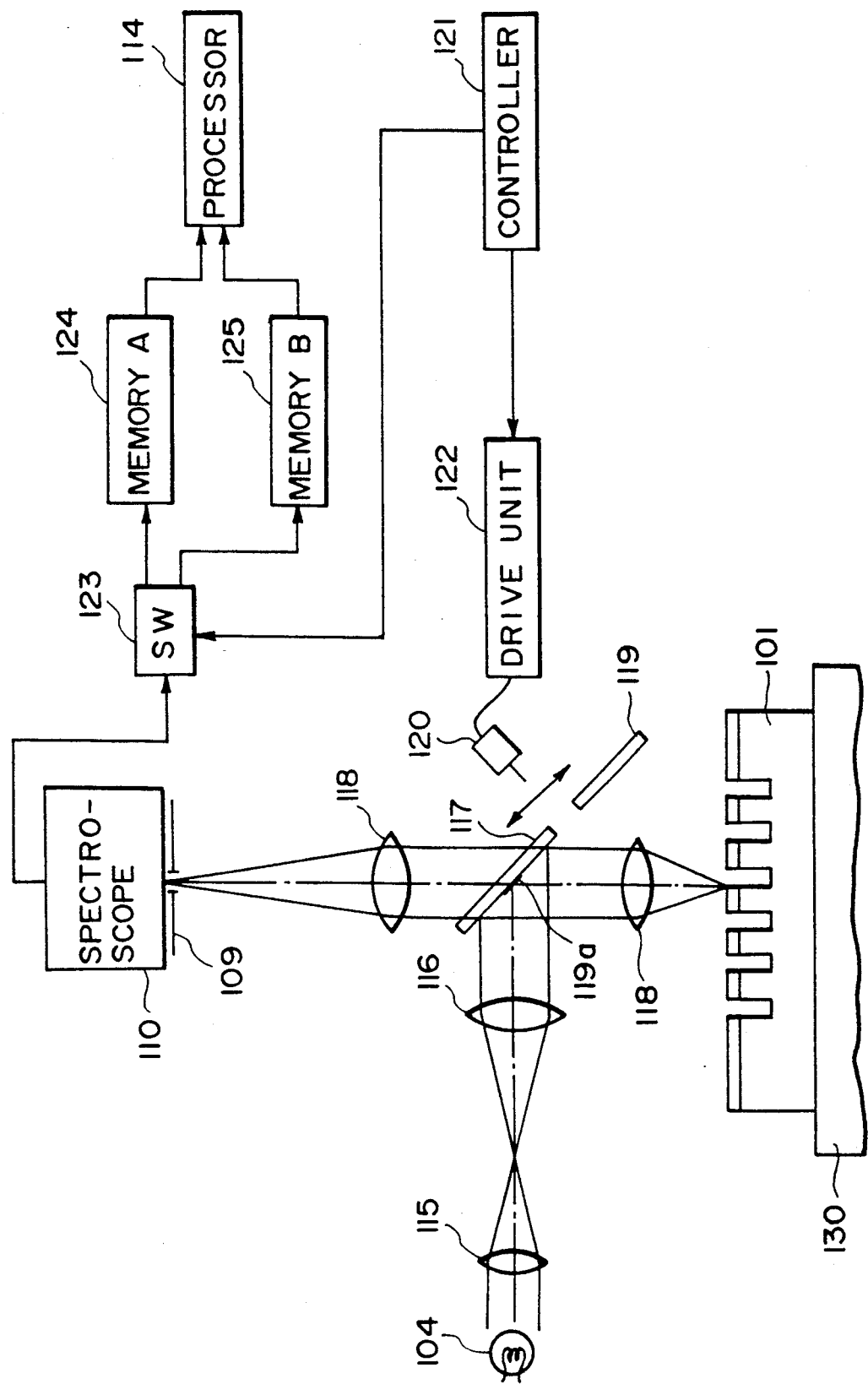
FIG. 9 is a schematic and diagrammatic representation showing a film thickness and groove depth measuring device according to a further embodiment of the present invention.

FIG. 9 shows a fourth embodiment wherein a thickness of a thin film and a depth of a groove can be measured by use of a single-series spectral measuring system, as compared with the embodiment of FIG. 7 wherein a two-series spectral measuring system comprising the spectroscopes A (110) and B (113), for example, is used.

Light source 104 which emits light of a broad band, lenses 115 and 116 and a mirror 117 as well as an objective lens 118 are used to illuminate the surface of a sample 101. The light reflected from the sample 101 surface is collected and imaged by the objective lens 118, the mirror 117 and another lens 118. On the imaging plane, there is provided a pinhole member or aperture member (such as a slit) 109. Behind the aperture 109, a spectroscope 110 is disposed. In this example, the mirror 117 is so formed that a portion 119a thereof provides a mirror surface while the remaining portion can transmit a light. Thus, the mirror 117 functions to intercept a specularly reflected light and to transmit and redirect a scattered light to the spectroscope 110. The mirror 117 and a half mirror 119 are interchangeable and, for this purpose, an appropriate mechanism 120 is used. The whole surface of the mirror 119 provides a half mirror surface. When the mirror 117 is replaced by the half mirror 119 by the mechanism 120, substantially only the specularly reflected light, of the light reflected from the sample, can enter into the spectroscope 110.

The measuring process is such as follows:

In order to obtain an output indicative of the result of spectral examination of the specularly reflected light only, a controller 121 supplies instruction signals to a driving unit 122 and a memory switching unit 123. The driving unit 122 cooperates with the half mirror interchanging mechanism 120 to set the half mirror 119 in place of the mirror 117. The memory switching unit 123 operates to direct the output of the spectroscope to a memory A (124), not to another memory B (125). Thus, the output concerning the specularly reflected light is stored into the memory A (124). Next, in order to obtain an output indicative of the result of spectral examination of the scattered light only, the controller 121 again operates to supply instruction signals to the driving unit 122 and the memory switching unit 123. The driving unit 122 cooperates with the half mirror interchanging mechanism 120 to set the mirror 117 in place of the mirror 119. The memory switching unit 123 operates to direct the output from the spectroscope to the memory B (125), not the memory A (124). Thus, the output concerning the scattered light is stored into the memory B (125). By using those data stored in the two memories A (124) and B (125) and by using the processor 114, the thickness of the thin film as well as the depth of the groove can be calculated.

Figure 10:
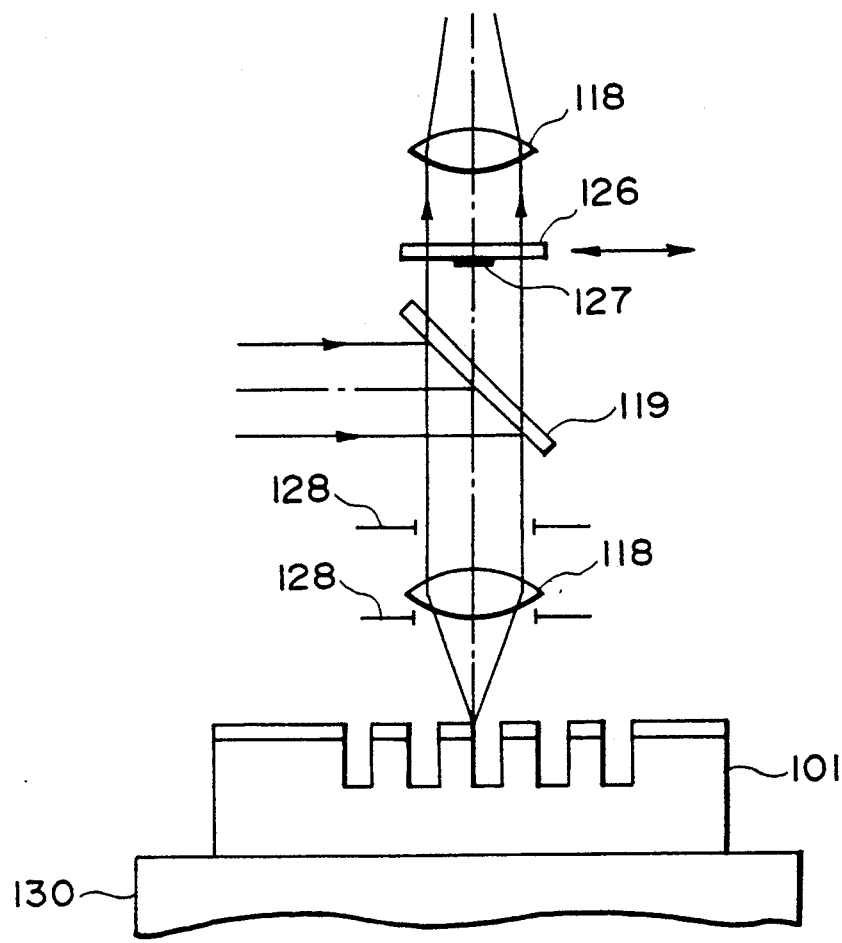
FIG. 10 is a fragmentary schematic illustration which shows a modified form of the FIG. 9 embodiment.

FIG. 10 shows an embodiment wherein the mirrors 117 and 119 of the FIG. 9 embodiment are replaced by a half mirror 119 and a filter 126. The half mirror 119 is fixedly secured. The filter 126 is disposed between the half mirror 119 and a lens 118. An absorbing plate is attached to a central portion 127 of the filter 126 so as to prevent transmission of light. The remaining portion of the filter can transmit light. Of the light irradiating the surface of the sample, those rays incident substantially perpendicularly upon the sample surface, if they are scattered, can pass through the filter 126. However, the specularly reflected component of the light illuminating the sample surface is intercepted by the filter 126. On the other hand, the scattered component of the sample illuminating light as having been incident thereupon at an incline is intercepted or shaded by the central portion 127 of the filter 126 and a barrel of the optics or a stop 128. Further, a specularly reflected component of light projected partially at an incline may pass through the filter 126. However, the amount is so small that they can be disregarded.

As described, when the filter 126 is introduced, a scattered light and only a small amount of specularly reflected light are received. When the filter 126 is retracted, only a specularly reflected light is received. The structural portion following the spectroscope which receives light from the lens 118, may be the same as that of the fourth embodiment.

While in these embodiments a local area on the surface of a sample is subjected to measurement, the stage may be driven to move the sample so that the measurement is made over the whole surface of the sample. It is possible to detect a specularly reflected light with respect to such a portion having only a thin film but having no groove, and to detect a scattered light with respect to such a portion having a groove as well as a thin film. The thickness of the thin film as well as the depth of the groove can be calculated in substantially the same procedure as described.

By spectrally examining a specularly reflected light and a scattered light separately, as described hereinbefore, different measurements can be made easily by the same device and with high precision.

While the invention has been described with reference to the structures disclosed herein, it is not confined to the details set forth and this application is intended to cover such modifications or changes as may come within the purposes of the improvements or the scope of the following claims.

What is claimed is:

1. A method of measuring the depth of a trench formed on an article having a surface layer, said method comprising the steps of:
   irradiating with light a first portion of the article without a trench;
   analyzing light from the irradiated first portion with respect to wavelength to produce first information related to the first portion;
   irradiating with light a second portion of the article with the trench, different from the first portion;

analyzing light from the irradiated second portion with respect to wavelength to produce second information related to the second portion; and determining the depth of the trench on the basis of the first and second information.

2. A method according to claim 1, wherein the first information represents a first spectral reflectivity related to the first portion and wherein the second information represents a second spectral reflectivity related to the second portion.

3. A method according to claim 2, wherein said determining step includes detecting a difference between the first and second spectral reflectivities and calculating the depth of the trench by using the detected difference.

4. A method according to claim 3, wherein, for the difference detection, one of the first and second spectral reflectivities is multiplied by a predetermined coefficient and wherein a difference between the result of the multiplication and the other spectral reflectivity is detected by subtraction.

5. A method according to claim 2, wherein said determination step includes dividing one of the first and second spectral reflectivities by the other, with the one or the other being multiplied by a predetermined coefficient, and calculating the depth of the trench by using the result of the division.

6. A method according to claim 1, wherein a common analyzer having a predetermined analysis position is used and wherein the analysis of the light from the irradiated first portion is first carried out with the first portion placed at the predetermined analysis position of the analyzer and then the analysis of the light from the irradiated second portion is carried out with the second portion being brought to the predetermined analysis position of the analyzer.

7. A method according to claim 6, wherein a common illumination device is used to illuminate the first and second portions of the article as placed at the predetermined analysis position.

8. A method according to claim 1, wherein different analyzers are used for the analysis of the light from the irradiated first portion and of the light from the irradiated second portion, respectively.

9. A method according to claim 8, wherein different illumination devices in cooperation with the different analyzers, respectively, are used to illuminate different analysis positions of the different analyzers, respectively.

10. A method according to claim 1, wherein, for the determination of the trench depth, a difference in level between the surface layer top and the trench bottom is calculated.

11. A method according to claim 10, wherein, for the determination of the trench depth, a thickness of the surface layer is then subtracted from the calculated level difference.

12. An apparatus for measuring the surface height difference of an article having a surface step formed thereon, said apparatus comprising:

first examining means for examining with light a first portion of the article without a surface step, and for determining a first spectral characteristic related to the first portion;

second examining means for examining with light a second portion of the article with the surface step, different from said first portion, and for determining a second spectral characteristic related to the second portion; and processing means for determining the height difference of the surface step of the article on the basis of the first and second spectral characteristics.

13. An apparatus according to claim 12, wherein a groove having the depth is formed in the surface of the article as the surface step and wherein said processing means determines the depth of the groove, as the height difference of the surface step.

14. An apparatus according to claim 12, wherein said first and second examining means include a common spectroscope having an inspection position and a common conveying system for moving the article, and wherein, as the first portion of the article is brought to the inspection position of said spectroscope by said conveying system, said first examining means determines a first spectral reflectivity related to the first portion while, as the second portion of the article is brought to the inspection position of said spectroscope by said conveying system, said second examining means determines a second spectral reflectivity related to the second portion.

15. An apparatus according to claim 14, wherein said first and second examining means include a common illumination device adapted to illuminate the inspection position of said spectroscope.

16. An apparatus according to claim 12, wherein said first examining means includes a first spectroscope for detecting a first spectral reflectivity related to the first portion of the article, and wherein said second examining means includes a second spectroscope, different from said first spectroscope, for detecting a second spectral reflectivity related to the second portion of the article.

17. An apparatus according to claim 16, wherein said first examining means includes a first illumination device for illuminating an inspection position of said first spectroscope and wherein said second examining means includes a second illumination device, different from said first illumination device, for illuminating an inspection position of said second spectroscope.

18. An apparatus according to claim 12, wherein said first examining means determines a first spectral reflectivity related to the first portion of the article as the first spectral characteristic, and wherein said second examining means determines a second spectral reflectivity related to the second portion of the article as the second spectral characteristic.

19. An apparatus according to claim 18, wherein said processing means includes means for detecting a difference between the first and second spectral reflectivities and means for calculating the height difference of the surface step by using the detected difference.

20. An apparatus according to claim 19, wherein said difference detecting means executes the detection through multiplication of one of the first and second spectral reflectivities by a predetermined coefficient and through subtraction for determining a difference between the result of the multiplication and the other spectral reflectivity.

21. An apparatus according to claim 18, wherein said processing means includes means for dividing one of the first and second spectral reflectivities by the other, with the one or the other being multiplied by a predetermined coefficient, and means for calculating the height difference of the surface step by using the result of the division.

22. An apparatus for measuring with light the depth of a trench of an article having a surface layer, said apparatus comprising:
   a first light receiving system having first analyzing means, for receiving regularly reflected light from the article and for determining a first spectral characteristic related mainly to the surface layer;
   a second light receiving system having second analyzing means, for receiving scatteredly reflected light from the article and for determining a second spectral characteristic related to the trench and the surface layer; and
   processing means for comparing the first and second spectral characteristics and for determining the depth of the trench on the basis of the comparison.

23. An apparatus according to claim 22, wherein said processing means detects a difference between the first and second spectral characteristics and determines the depth of the trench on the basis of the detected difference.

24. An apparatus according to claim 23, wherein, for the difference detection, said processing means multiplies one of the first and second spectral characteristics by a predetermined coefficient and then detects a difference between the result of the multiplication and the other spectral characteristic by subtraction.

25. An apparatus according to claim 22, wherein said processing means divides one of the first and second spectral characteristics by the other, with the one or the other being multiplied by a predetermined coefficient.

26. An apparatus according to claim 22, further comprising means for determining the thickness of the surface layer.

27. An apparatus according to claim 22, further comprising illumination means for illuminating the article, wherein said first light receiving means receives regularly reflected light from the article illuminated by said illumination means while said second light receiving means receives scatteredly reflected light from the article illuminated by said illumination means.

28. An apparatus according to claim 27, wherein said first and second light receiving systems include a common optical system for directing light from the article, a common light receiving portion for receiving the light from said common optical system, and selecting means operable such that the regularly reflected light and the scatteredly reflected light from the article are selectively received by said common light receiving portion.

29. An apparatus according to claim 22, wherein, for the determination of the trench depth, said processing means calculates a difference in level between the surface layer top and the trench bottom.

30. An apparatus according to claim 29, wherein said processing means then subtracts a thickness of the surface layer from the calculated level difference.

31. An apparatus for measuring a surface height difference of an article having a surface step formed thereon and a surface layer, said apparatus comprising:
   a light source;
   an illumination optical system for illuminating the article with light from said light source;
   a first light collection optical system for collecting regularly reflected light from the article illuminated by said illumination optical system;
   a first detecting means for detecting a first spectral characteristic of the light collected by said first light collecting optical system, said first spectral characteristic being related mainly to the surface layer of the article;
   a second light collecting optical system for collecting scatteredly reflected light from the article illuminated by said illumination optical system;
   a second detecting means for detecting a second spectral characteristic of the light collected by said second light collecting optical system, said second spectral characteristic being related the surface step and the surface layer of the article; and
   a processing means for determining the height difference on the basis of a comparison of the first and second spectral characteristics.

32. An apparatus according to claim 31, wherein said processing means detects a difference between the first and second spectral characteristics and determines the height difference on the basis of the detected difference.

33. An apparatus according to claim 32, wherein, for the difference detection, said processing means multiplies one of the first and second spectral characteristics by a predetermined coefficient and detects a difference between a result of the multiplication and the other spectral characteristic.

34. An apparatus according to claim 31, wherein for the determination of the height difference, said processing means divides one of the first and second spectral characteristics by the other, with the one or the other being multiplied by a predetermined coefficient.

35. An apparatus according to claim 31, wherein said first and second detecting means includes a common spectroscope, and wherein said first and second light collecting optical systems include a common lens system and a common light selecting element by which the regularly reflected light and the scatteredly reflected light are selectively received by said common spectroscope.

36. An apparatus according to claim 31, wherein, for the determination of the height difference, said processing means calculates a difference in level between the surface layer top and the surface step bottom.

37. An apparatus according to claim 36, wherein said processing means then subtracts a thickness of the surface layer from the calculated level difference.

* * * * *

UNITED STATES PATENT AND TRADEMARK OFFICE
CERTIFICATE OF CORRECTION

PATENT NO. : 5,087,121
DATED : February 11, 1992
INVENTOR(S) : OSAMU KAKUCHI, ET AL.          Page 1 of 3

It is certified that error appears in the above-identified patent and that said Letters Patent is hereby corrected as shown below:

AT [57] ABSTRACT

Line 1, "depth" should read --the depth--.

COLUMN 2

Line 14, "spectroscope 8" should read --spectroscope 68--.
Line 24, "where, is" should read --where $\lambda$ is--.
Line 51, "spectroscope 8" should read --spectroscope 68--.

COLUMN 3

Line 39, "the later" should read --the latter--.

COLUMN 4

Line 57, "source; at" should read --source; denoted at--.
Line 58, "lens; at" should read --lens; denoted at--.
Line 62, "gate; at" should read --gate; denoted at-- and "is" (second occurrence) should read --are--.

COLUMN 5

Line 11, "and at" should read --and denoted at--.

COLUMN 6

Line 5, "is as" should read --as is--.

UNITED STATES PATENT AND TRADEMARK OFFICE
CERTIFICATE OF CORRECTION

PATENT NO. : 5,087,121

DATED : February 11, 1992

INVENTOR(S) : OSAMU KAKUCHI, ET AL.

It is certified that error appears in the above-identified patent and that said Letters Patent is hereby corrected as shown below:

COLUMN 7

Line 12, "and," should be deleted.
    Line 30, "number" should read --number)--.
    Line 56, "equation (9),)," should read --equation (9),--.

COLUMN 8

Line 8, "22," should read --22 is--.
    Line 11, "member; at" should read --member; denoted at--.
    Line 35, "respectively" should read --respectively,--.
    Line 61, "low frequency" should read --low-frequency--.

COLUMN 9

Line 59, "groove" should read --groove 103--.
    Line 63, "of ordinate" should read --of the ordinate--.

COLUMN 10

Line 42, "sample 1" should read --sample 101--.
    Line 53, "low" should read --low- --.

COLUMN 12

Line 26, "they" should read --it--.

COLUMN 14

Line 5, "the depth" should read --a depth--.

UNITED STATES PATENT AND TRADEMARK OFFICE
CERTIFICATE OF CORRECTION

PATENT NO. : 5,087,121
DATED : February 11, 1992
INVENTOR(S) : OSAMU KAKUCHI, ET AL.   Page 3 of 3

It is certified that error appears in the above-identified patent and that said Letters Patent is hereby corrected as shown below:

COLUMN 16

Line 7, "collection" should read --collecting--.
Line 21, "related the" should read --related to the--.

Signed and Sealed this

Nineteenth Day of October, 1993

Attest:

BRUCE LEHMAN

*Attesting Officer*   *Commissioner of Patents and Trademarks*